United States Patent [19]

Thibault et al.

[11] 4,397,832

[45] Aug. 9, 1983

[54] MANUFACTURE OF CALCIUM HYPOCHLORITE

[75] Inventors: Gilbert Thibault, Coquitlam; David C. Mayotte, Hull, both of Canada

[73] Assignee: C-I-L Inc., North York, Canada

[21] Appl. No.: 361,578

[22] Filed: Mar. 24, 1982

[30] Foreign Application Priority Data

Mar. 27, 1981 [CA] Canada .................................. 374067

[51] Int. Cl.$^3$ ............................................. C01B 11/06
[52] U.S. Cl. .................................................. 423/474
[58] Field of Search ......................................... 423/474

[56] References Cited

U.S. PATENT DOCUMENTS

| | | | |
|---|---|---|---|
| 934,467 | 9/1909 | Schultze | 423/474 |
| 1,583,421 | 5/1926 | Pistor | 423/474 |
| 1,884,200 | 10/1932 | Philipp | 423/474 |
| 2,889,199 | 6/1959 | Osborne | 423/474 |
| 3,760,064 | 9/1973 | Droste | 423/474 |
| 3,956,471 | 5/1976 | Pullman | 423/474 |
| 4,364,917 | 12/1982 | Tiedemann | 423/474 |

FOREIGN PATENT DOCUMENTS

| | | | |
|---|---|---|---|
| 890164 | 12/1981 | Belgium | 423/474 |
| 55-15902 | 2/1980 | Japan | 423/474 |
| 55-167103 | 12/1980 | Japan | 423/474 |

*Primary Examiner*—Brian E. Hearn
*Attorney, Agent, or Firm*—C. Brian Barlow

[57] ABSTRACT

A process for making calcium hypochlorite from caustic soda calcium hydroxide and chlorine by feeding to a stirred reactor an aqueous solution of the total required amount of caustic soda and an aqueous suspension of up to 80% by weight of the total required amount of calcium hydroxide, passing chlorine through the mixture until a redox potential of 650 to 800 mV is reached and while continuing chlorination adding the remaining of the calcium hydroxide at such rate with respect to chlorine that redox potential gradually increases to between 850 and 950 mV. This process prevents thickening and caking which are a recognized problem with conventional batch processes.

5 Claims, No Drawings

MANUFACTURE OF CALCIUM HYPOCHLORITE

This invention relates to improvements in the batch-wise manufacture of calcium hypochlorite.

Calcium hypochlorite is widely used for water treatment and in other sanitizing applications and for this purpose, the material may contain minor amounts of impurities such as calcium chloride and sodium chloride. For commercial acceptance, calcium hypochlorite should contain at least 65% available chlorine less than 2% water and have a certain particle size distribution. One process which can be used to manufacture a product meeting this specification is the interraction of calcium hydroxide, caustic soda and chlorine according to the following equation:

$$3Ca(OH)_2 + 2NaOH + 4Cl_2 \rightarrow 2Ca(OCl)_2 + 2NaCl + CaCl_2 + 4H_2O$$

A wide range of process exists for the production of calcium hypochlorite. Batchwise processes were first developed and rapidly abandoned because they faced a critical thickening/caking problem which limits their use. To minimize the viscosity problem which made it most difficult to stir and chlorinate the lime slurry, it was necessary to add large amounts of dilution water. However such addition of extra dilution water resulted in substantial loss in process yield.

Through further development, continuous operation within some specific conditions permitted to avoid this viscosity problem and obtain higher yield through optimization of the amount of process water used. Based on this, numerous continuous processes were developed industrially. However, they operate in more or less narrow conditions gap which makes their control more critical. This leads to less flexible processes which are more influenced by fluctuations of the operating conditions.

Furthermore, the continuous processes, by their nature, require more complex equipment than the batch process and thus necessitate higher capital investment. This makes such processes much less economically attractive for small production requirements especially when one considers that equipment used in this technology is made out of titanium.

Typically, the conventional batch process is carried out by passing chlorine gas into a slurry of lime and caustic soda in water. When the reaction is completed, the product is separated from the mother liquor and dried. Conveniently, the sodium hydroxide may be supplied as a concentrated solution as normally obtained from caustic soda-chlorine manufacturing operations. In any case, the sodium hydroxide should be dissolved in water prior to chlorination. The high grade lime is added as a slurry to the sodium hydroxide solution and chlorine is passed through the agitated sodium hydroxide/calcium hydroxide slurry at appropriate rate while the temperature is maintained in the range of 5° C.–40° C.

After reaction, the calcium hypochlorite is recovered and separated from the mother liquor in the batch by any suitable conventional solids-liquid separation technique. The final stages of the process are drying and "forming" of the product to meet the needs of particular consumers. Various processing alternatives are well known.

In those developed batch processes, all caustic soda and lime required for the reaction is added into the reactor before starting the chlorination. During chlorination, the viscosity of the reacting slurry varies, reaching a maximum when about 30% of total chlorine has been added. This maximum viscosity peak always corresponds to 650 to 700 mV redox potential measurement. At this point, the viscosity can be 100 times or more higher than normal and the reacting slurry thickens severely. Sometimes hard caking of the whole reactor batch can be observed.

The reason for this thickening and caking to occur is not entirely known and the ever present possibility of such a situation developing always has been an objection for major industrial development of the batch process.

It has now been found that the batch process operating conditions may be modified to avoid such a viscosity problem, Accordingly, in the known process of preparing a slurry of calcium hypochlorite by reacting chlorine with an aqueous slurry of calcium hydroxide and sodium hydroxide, the present invention provides the improvement consisting of:

(a) loading a stirred reactor with an aqueous solution of the total required amount of sodium hydroxide, and from 10% to 80% by weight of the total required amount of calcium hydroxide as an aqueous suspension.

(b) passing chlorine through this suspension until the reaction mixture has reached a redox potential in the range of 650 to 800 mV;

(c) while continuing chlorination, continuously adding the remaining of the calcium hydroxide at such a rate with respect to chlorine that the redox potential gradually increases to a value from 850 to 950 mV; and (d) collecting the resulting slurry of calcium hypochlorite, while maintaining the temperature of the reaction mixture throughout the reaction in the range from 10° C. to 30° C.

The rates of addition of the reagents are not narrowly critical. The temperature of the reaction may be partially controlled by the rate of addition of the reactants. The reactants may be cooled by any convenient method. Preferably temperature is controlled by means of cooling coils.

The product from the process comprises an aqueous slurry of calcium hypochlorite and the latter may be separated from the mother liquor and dried by any convenient method known in the art. Before solids-liquids separation and further processing by any of said convenient methods, the calcium hypochlorite slurry can advantageously be cooled down for maximum crystallization of soluble hypochlorite.

The molar ratio of calcium hydroxide to caustic soda to chlorine is approximately that required by the equation shown above i.e. 3:2:4. The amount of caustic soda is not critical and can be varied as long as the total amount of chlorine is adjusted to meet the stoichiometric demand. In the first step of the process, calcium hydroxide is fed as a suspension in the aqueous solution of the caustic soda. In the third step the calcium hydroxide is fed as a suspension in sufficient water to produce a reactor slurry which is adequately stirrable and pumpable. The total of water used in the process is not critical in that it does not substantially affect the occurring chemical reactions but it has importance with regard to process yield and product quality. Whereas, for instance, a process using a certain amount of water would yield a product having 85% available chlorine, the same process using 50% less water will result in a product having only 55% available chlorine and an increase of 40% in yield. Because of this phenomenon which is well known to those versed in the art, care must be exercised in formulating the charge of reactants to select the amount of water which will meet the required specifications for yield and product quality.

The proper amount of calcium hydroxide (lime) to be added in the first step of the process can vary from 10% to 80% by weight of the total amount required in the process and is apparently function of the physical properties of the particular lime used as a starting material. From the following examples, it will be realized that the amount of lime which has to be fed into the first step in order to obtain optimum results varies widely from one particular lime to another. While it is stated above that this may depend upon the physical properties of the particular lime used as starting material, the reasons why this is so are not known. Therefore the proper amount of lime to be added in the first step must be determined experimentally.

Compared with the conventional batch process, the present process offers several important advantages. For instance it improves control of the viscosity of the reaction mixture. Indeed whereas, in the conventional batch process the viscosity of the reaction mixture increases markedly as the reaction proceeds, the present two step lime addition technique allows the reaction mixture to remain fluid at anytime.

The above advantage coupled with control of the rate of addition of lime in the third step of the process allow formation of crystals of good setting rate easily filtered and containing relatively low moisture (about 30%).

The process is highly reproducible and can be computer controlled through measurement of the oxidoreduction potential of the reaction mixture.

In addition the process has a high flexibility. A wide range of product quality can be achieved by varying the total amount of water and caustic soda used. Such variation has no significant effect on the reaction mixture viscosity during chlorination.

The invention is illustrated by, but by no means limited to the following examples.

EXAMPLE I

Calcium hypochlorite was prepared in nine batches using lime A (SOBRENICK lime). Batches 1 and 2 were carried out by the conventional batch process whereas batches 3 to 9 were made according to the process of the present invention. In all of the batches, the reaction temperature was maintained at 15° C. to 25° C. and the total amount of lime used was the same. Total amount of water and/or total amount of caustic soda could be varied from one batch to the other. In batches 3 to 9 carried out by the process of the invention, two thirds of the total lime was added with the total caustic soda in the first step of the process whereas one third was added in the third step as a 30% water slurry. The results obtained with the nine batches were as follows:

TABLE I

| Batch No. | Total $H_2O$ kg | Total NaOH kg | Total Lime kg | % Yield on $Cl_2$ | % Available $Cl_2$ in dried product |
|---|---|---|---|---|---|
| 1 | 209.5 | 24.2 | 71.3 | 0 (caking; product lost viscosity >500 units) | 0 |
| 2 | 251.9 | 24.2 | 71.3 | 56.3 (hard caking but batch saved) viscosity >20 units | 84.9 |

TABLE I-continued

| Batch No. | Total $H_2O$ kg | Total NaOH kg | Total Lime kg | % Yield on $Cl_2$ | % Available $Cl_2$ in dried product |
|---|---|---|---|---|---|
| 3 | 209.5 | 24.2 | 71.3 | 68.4 | 84.4 |
| 4 | 189.0 | 24.2 | 71.3 | 72.3 | 83.0 |
| 5 | 178.0 | 24.2 | 71.3 | 80.2 | 78.0 |
| 6 | 168.0 | 24.2 | 71.3 | 81.1 | 69.1 |
| 7 | 225.0 | 24.2 | 71.3 | 65.5 | * |
| 8 | 225.0 | 26.5 | 71.3 | 70.1 | * |
| 9 | 225.0 | 30.1 | 71.3 | 72.0 | * |

*not calculated
In all of batches 3 to 9 the viscosity was around 5 units.

EXAMPLE 2

Calcium hypochlorite was prepared in four batches using lime B (Steel Brothers lime) at a reaction temperature of 15° C. to 25° C. All batches were done using a total of 215 kg $H_2O$, 23.4 kg NaOH and 65.6 kg lime (97% $Ca(OH)_2$).

To start the reaction, all the caustic soda with required amounts of water and lime were loaded into the reactor. For batches 2 to 4, part of the lime and enough water to get a 30% lime suspension were saved for a second lime addition. The results were as follows:

TABLE II

| Batch No. | % of Total Lime used in 1st Addition | % of Total Lime used in 2nd Addition | % Yield on $CL_2$ | % Available $Cl_2$ in Product | Settling Test |
|---|---|---|---|---|---|
| 1 | 100 | 0 | 0 caking; severe caking | 0 batch lost | — |
| 2 | 66 | 33 | | | 900 |
| 3 | 30 | 70 | 81.3 | 71.7 | 540 |
| 4 | 20 | 80 | 77.1 | 63.5 | 495 |

Settling Test:
Total volume of thickened slurry after 2 hours settling as compared to an initial slurry sample of 1000 cc.

We claim:
1. A process for the preparation of calcium hypochlorite by interreaction of chlorine, sodium hydroxide and calcium hydroxide comprising the steps:
   (a) loading a stirred reactor with an aqueous solution of the total required amount of sodium hydroxide and from 10% to 80% by weight of the total required amount of calcium hydroxide as an aqueous suspension;
   (b) passing chlorine through this suspension until the reaction mixture has reached a redox potential in the range of 650 to 800 mV;
   (c) while continuing chlorination, continuously adding the remaining of the calcium hydroxide at such a rate with respect to chlorine that the redox potential gradually increases to a value from 850 to 950 mV; and
   (d) collecting the resulting slurry of calcium hypochlorite; the temperature of the reaction mixture throughout the reaction being maintained in the range from 10° C. to 30° C.
2. A process as claimed in claim 1 wherein in Step (a) about 66% by weight of the total required amount of calcium hydroxide is fed to the reactor as an aqueous suspension.
3. A process as claimed in claim 1 wherein in Step (a) about 30% by weight of the total required amount of calcium hydroxide is fed to the reactor as an aqueous suspension.
4. A process as claimed in claim 1, 2 or 3 wherein in Step (c) the remaining of the calcium hydroxide is added in the form of an aqueous suspension.
5. A process as claimed in claim 1, 2 or 3 wherein the total amounts of the reagents added to the reactor are adjusted so that the molar ratio of calcium hydroxide to sodium hydroxide to chlorine is approximately 3:2:4.

* * * * *